United States Patent
Smith

(10) Patent No.: US 6,857,565 B2
(45) Date of Patent: Feb. 22, 2005

(54) ELECTRONIC TRAVELER'S CHECKS

(76) Inventor: Damon Eugene Smith, 21 Studio Lane, Flatts (BM), FL04

( * ) Notice: Subject to any disclaimer, the term of this patent is extended or adjusted under 35 U.S.C. 154(b) by 132 days.

(21) Appl. No.: 10/283,221

(22) Filed: Oct. 30, 2002

(65) Prior Publication Data

US 2003/0111526 A1 Jun. 19, 2003

Related U.S. Application Data

(60) Provisional application No. 60/339,470, filed on Dec. 14, 2001.

(51) Int. Cl.[7] .............................................. G08K 5/00
(52) U.S. Cl. .................... 235/380; 235/379; 705/41; 705/44
(58) Field of Search ................................ 235/375, 379, 235/380, 382; 705/16, 17, 26, 39, 41–44; 902/1–6, 25–27

(56) References Cited

U.S. PATENT DOCUMENTS

| | | | |
|---|---|---|---|
| 3,859,508 A | * | 1/1975 | Brosow et al. ............. 235/380 |
| 4,926,031 A | | 5/1990 | Stenzel |
| 5,264,689 A | | 11/1993 | Maes et al. |
| 5,455,407 A | | 10/1995 | Rosen |
| 5,477,038 A | * | 12/1995 | Levine et al. ............... 235/380 |
| 5,644,118 A | | 7/1997 | Hayashida |
| 5,684,291 A | | 11/1997 | Taskett |
| 5,850,077 A | | 12/1998 | Tognazzini |
| 5,884,271 A | * | 3/1999 | Pitroda .......................... 705/1 |
| 5,988,509 A | | 11/1999 | Taskett |
| 6,000,608 A | | 12/1999 | Dorf |
| 6,018,717 A | | 1/2000 | Lee et al. |
| 6,145,741 A | | 11/2000 | Wisdom |
| 6,164,528 A | | 12/2000 | Hills et al. |
| 6,182,891 B1 | | 2/2001 | Furuhashi et al. |
| 6,223,169 B1 | | 4/2001 | Mori et al. |
| 6,224,109 B1 | | 5/2001 | Yang |
| 6,257,487 B1 | | 7/2001 | Hayashida |
| 6,266,647 B1 | | 7/2001 | Fernandez |
| 6,268,927 B1 | | 7/2001 | Lo et al. |
| 6,283,366 B1 | | 9/2001 | Hills et al. |
| 6,305,717 B1 | | 10/2001 | Chess |
| 6,308,268 B1 | | 10/2001 | Audebert |
| 6,338,048 B1 | * | 1/2002 | Mori ........................... 705/41 |
| 6,412,692 B1 | * | 7/2002 | Miyagawa .................. 235/382 |

FOREIGN PATENT DOCUMENTS

| | | |
|---|---|---|
| GB | 1 535 340 | 12/1978 |
| WO | WO 83/03694 | 10/1983 |
| WO | WO 93/10509 | 5/1993 |

* cited by examiner

*Primary Examiner*—Michael G. Lee
*Assistant Examiner*—Jamara A. Franklin
(74) *Attorney, Agent, or Firm*—Richard C. Litman

(57) ABSTRACT

An electronic traveler's check system and method comprising an electronic travelers check card which is useable to retrieve money from point of service locations and banks. The system has a database of user information such as a pin number and the user's passport number which is used to verify the identity of the user before a transaction can take place.

12 Claims, 5 Drawing Sheets

24 ⟶

```
┌─────────────────────────────────────────────────────────────┐
│         ELECTRONIC TRAVELER'S CHECK APPLICATION             │
│                        28                        30         │
│         26                                                  │
│   NAME_____  PASSPORT NO._____       │
│   ADDRESS_____   PASSPORT NO._____       │
│   COUNTY_____   2nd P.P. NO. OPTIONAL              │
│   STATE_____   PASSPORT EXPIRATION DATE____       │
│   ZIP CODE_____   PASSPORT EXPIRATION DATE____       │
│   PHONE NO. _____                                     │
│   DATE OF BIRTH _____                                     │
│                                                             │
│      32      SPOUSE (OR SECOND CARD HOLDER)     34          │
│                                                             │
│   NAME_____  PASSPORT NO._____       │
│   ADDRESS_____   PASSPORT NO._____       │
│   COUNTY_____   2nd P.P. NO. OPTIONAL              │
│   STATE_____   PASSPORT EXPIRATION DATE____       │
│   ZIP CODE_____   PASSPORT EXPIRATION DATE____       │
│   PHONE NO. _____                                     │
│   DATE OF BIRTH _____                                     │
│                                                             │
│                      38                                     │
│   AMOUNT DEPOSITED ON ELECTRONIC TRAVELER'S CHECK _____     │
│   12 OR 24 HR. CHANGE OVER TIME, HOURS_____,MINUTES____     │
│   FOR THE 24 HR. CHANGE OVER TIME, AM_____; PM_____     │
│   12HR. MAXIMUM WITHDRAWAL AMOUNT_____   │
│   24HR. MAXIMUM WITHDRAWAL AMOUNT_____   │
│   SIGNATURE _____    │
│   SIGNATURE _____    │
│                                                   42        │
│        40                                                   │
│   BANK EMPLOYEE'S SIGNATURE _____;DATE_____     │
│                         44           46                     │
└─────────────────────────────────────────────────────────────┘
```

*FIG. 2*

ELECTRONIC TRAVELER'S CHECKS

CROSS-REFERENCE TO RELATED APPLICATION

This application claims the benefit of U.S. Provisional Patent Application Ser. No. 60/339,470, filed Dec. 14, 2001.

BACKGROUND OF THE INVENTION

1. Field of the Invention

The present invention relates generally to electronic monetary systems. More specifically, the invention is business method and system for conducting monetary transactions electronically with a variety of safety and security features.

2. Description of Related Art

The related art of interest describes various bankcard systems, but none discloses the present invention of an electronic traveler's check system and method. The related art will be discussed in the order of relevance to the present invention.

U.S. Pat. No. 6,182,891 B1 issued on Feb. 6, 2001, to Nobuo Furuhashi et al. describes a financial processing system comprising an electronic account bankbook, a money transfer card, a receipt file, and a checkbook utilizing an optical card, and an integrated circuit chip containing IC card, or a hybrid optical/IC card. The IC card memory has written validation keys, search keys, payee information, the upper limit amount of a check, and a program for processing transaction data. The history of various cash transactions is recorded in the optical recording sheet which is of write-once type, and rewriting or deletion thereof is impossible.

U.S. Pat. No. 6,283,366 B1 issued on Sep. 4, 2001, and U.S. Pat. No. 6,164,528 issued on Dec. 26, 2000, to Robert R. Hill et al. describe a check writing point of sale system adapted for computerized reading by a point-of-sale by a sales terminal of a customer's check, credit card or by manual input with subsequent debiting of a consumer's account and crediting the merchant's account for the goods or services provided.

U.S. Pat. No. 6,000,608 issued on Dec. 14, 1999, to Robert E. Dorf describes a multifunction card system capable of serving as a prepaid phone card, a debit card, a loyalty card for rewarding consumers for purchasing goods and services, and a medical information card, which is accessed by a merchant as a point-of-sale device.

U.S. Pat. No. 5,684,291 issued on Nov. 4, 1997, and U.S. Pat. No. 5,988,509 issued on Nov. 23, 1999, to John M. Taskett describes a refundable prepaid telephone card.

U.S. Pat. No. 4,926,031 issued on May 15, 1990, to Gerhard Stenzel describes a security document such as a credit card or an identification card having a signing stripe, a centered horizontal fluorescent line, a narrow vertical slot diaphragm traversing the horizontal line, and a vertical double arrow marker adjacent the narrow slot diaphragm.

U.S. Pat. No. 5,264,689 issued on Nov. 23, 1993, to Philippe Maes et al. describes a rechargeable prepaid memory card with both unit and page counters for purchasing goods or services. A non-volatile electrically programmable memory (EPROM) circuit is included within the card.

U.S. Pat. No. 5,455,407 issued on Oct. 3, 1995, to Sholom S. Rosen describes a complete electronic monetary system comprising (1) issuing banks coupled to a money generator device; (2) correspondent banks accepting and distributing the electronic money; (3) a plurality of transaction devices used by subscribers for storing electronic money; (4) teller devices for the issuing and correspondent banks; (5) a security arrangement for maintaining the integrity of the system; and (6) reconciliation and clearing processes to monitor and balance the monetary system.

U.S. Pat. No. 5,644,118 issued on Jul. 1, 1997, and U.S. Pat. No. 6,257,487 B1 issued on Jul. 10, 2001, to Shoji Hayashida describes an electronic cashless system comprising an automatic transaction terminal device having a reading/writing unit for writing amount information to a cashless medium, and a center device having a unit for identifying the account balance of multiple accounts and for storing account information, a non-settled fund file unit for storing amount information written by the cashless medium, and a seller ledger file means for identifying the account balance of the multiple seller's accounts and for storing amount information.

U.S. Pat. No. 5,850,077 issued on Dec. 15, 1998, to Bruce Tognazzini describes a portable card authorizer system comprising a portable unit having a credit card reader for reading an authorization code and a first wireless transceiver for transmitting the card authorization to a base unit. The base unit has a second wireless receiver. The base unit causes the second wireless transceiver to transmit a credit approval or denial.

U.S. Pat. No. 6,018,717 issued on Jan. 25, 2000, to Alson Lee et al. describes a method and apparatus for acquiring access using a fast smart card transaction comprising the payment of goods or services by a credit card examined by a computerized system of an access device to read the card and perform first and second authentication processes.

U.S. Pat. No. 6,145,741 issued on Nov. 14, 2000, to Juanita J. Wisdom et al. describes a universal pre-paid gasoline and oil travel card system comprising an encoded card and a data bank for purchases made at member gas stations for gas, oil and sundry items.

U.S. Pat. No. 6,223,169 B1 issued on Apr. 24, 2001, to Toru Mori et al. describes an electronic transaction processing system for transferring a monetary value between a payer and a receiver including a first memory apparatus storing a payer's digital cash, a second memory apparatus storing a receiver's digital cash, and a third memory apparatus storing temporarily the payer's digital cash transferred from the first memory apparatus. The credit card has an integrated circuit and terminal for processing the transaction.

U.S. Pat. No. 6,224,109 B1 issued on May 1, 2001, to James Y. Yang describes a credit card with a driver's license or identification comprising a photograph, a magnetic strip storing information providing access to the credit of the holder and personal information.

U.S. Pat. No. 6,266,647 issued on Jul. 24, 2001, to Alberto Fernandez describes methods and apparatus for a value storage system in which information is directly written to a portable card as a reference fingerprint. The system includes a plurality of read/write units for storing and retrieving the value information. Each of the read/write units include a data authenticator for authenticating information previously stored on the storage medium. The authentication information consists of a numerical representation of a level of trapped charges in an EEPROM representing the reference fingerprint. The read/write units are connected to a central server which retrieves information from each read/write unit, stores information, and provides various accounting and statistical analyses, and reconciling transactions between the plurality of read/write units. The stored value represents units of value employed in a company loyalty program which are stored on a portable media during a sales transaction, and later redeemed for purchase of or discounts on merchandise or a gaming player's points or winnings.

U.S. Pat. No. 6,268,927 issued on Jul. 31, 2001, to Robin Lo et al. describes method and apparatus for overlaying a data image on a form image, and includes a form enhancement module that interfaces to a PostScript drive and a forms overlay plug in the module. A change of address card is filled out and recorded in the system.

None of the above inventions and patents, taken either singly or in combination, is seen to describe the instant invention as claimed.

SUMMARY OF THE INVENTION

The present invention is directed to an electronic traveler's check (ETC) system and method having verification characteristics that is usable in conjunction with various other foreign and domestic electronic monetary systems including the issuing financial institution. The ETC is adapted for withdrawing monetary funds from foreign and domestic subscribers with automated teller machines (ATM), point of sale (POS) systems and banks.

The ETC card has two variations, the first is the multi-withdraw, single deposit card. The customer purchases an ETC card and deposits as much money as desired in an account linked to the card. The customer is allowed to make as many bank withdrawals, ATM withdrawals, or Points of Sales (POS) purchases as required to deplete the account. When the linked account is depleted, the card becomes invalid and may be disposed of. The next time the customer needs another ETC card, the customer simply repeats the purchasing process given above.

The second variation of the ETC card is a multi-use, recharge-able card. A customer purchases an ETC card and deposits as much money as desired in an account linked to the card. The customer is allowed to make as many withdraws or POS purchases as desired. When the funds are depleted, the customer has the option to add additional funds to their linked account. A second important difference between the two abovementioned ETC cards is that the rechargeable card has an expiration date that coincides with the expiration date of the customer's passport.

In addition to purchasing an ETC card and making a deposit into a linked account the customer must also provide verification data and security data. This data is used to prevent fraudulent transactions and to provide card security.

Accordingly, it is a principal object of the invention to provide an electronic traveler's check comprising a ETC card.

It is another object of the invention to provide an electronic traveler's check suitable for financial use when traveling domestically or in other countries.

It is a further object of the invention to provide an electronic traveler's check usable domestically or in foreign countries with a passport and a personal identity number (PIN).

Still another object of the invention is to provide an electronic traveler's check usable at an ATM or inside a bank of a domestic or foreign country.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a front elevational view of an application form for applying for the electronic traveler's check from a specific bank.

Similar reference characters denote corresponding features consistently throughout the attached drawings.

DETAILED DESCRIPTION OF THE PREFERRED EMBODIMENT

The present invention is directed to an electronic traveler's check (ETC) system and method having verification characteristics and usable in conjunction with various other foreign and domestic electronic monetary systems including the issuing financial institution. The ETC card is adapted for withdrawing monetary funds from foreign and domestic subscribers with automated teller machines (ATM), point of sale (POS) systems and banks.

Figure 1A:
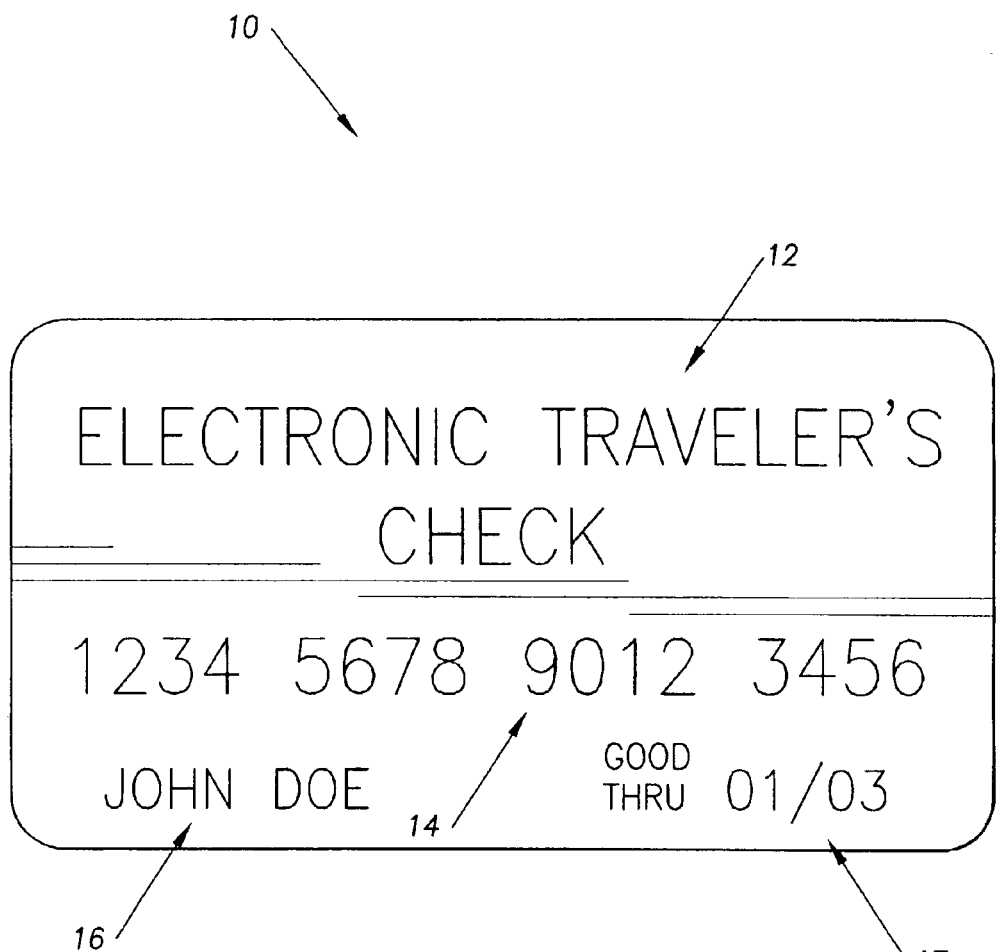
FIG. 1A is a perspective front view of an electronic traveler's check card according to the present invention.

The ETC card itself, as depicted in FIGS. 1A (front face) and 1B (rear face) to an Electronic Traveler's Check Card 10 comprising a rectangular plastic electronic traveler's check (ETC) card having verification characteristics such as the Electronic Traveler's check indicia 12, account number 14 and printed user's name 16 as John Doe on the front face (FIG. 1A) of the ETC 10. An period of use 17 such as three years is stamped as a necessary security measure. In this example, the ETC 10 will expire in January of 2003.

Figure 1B:
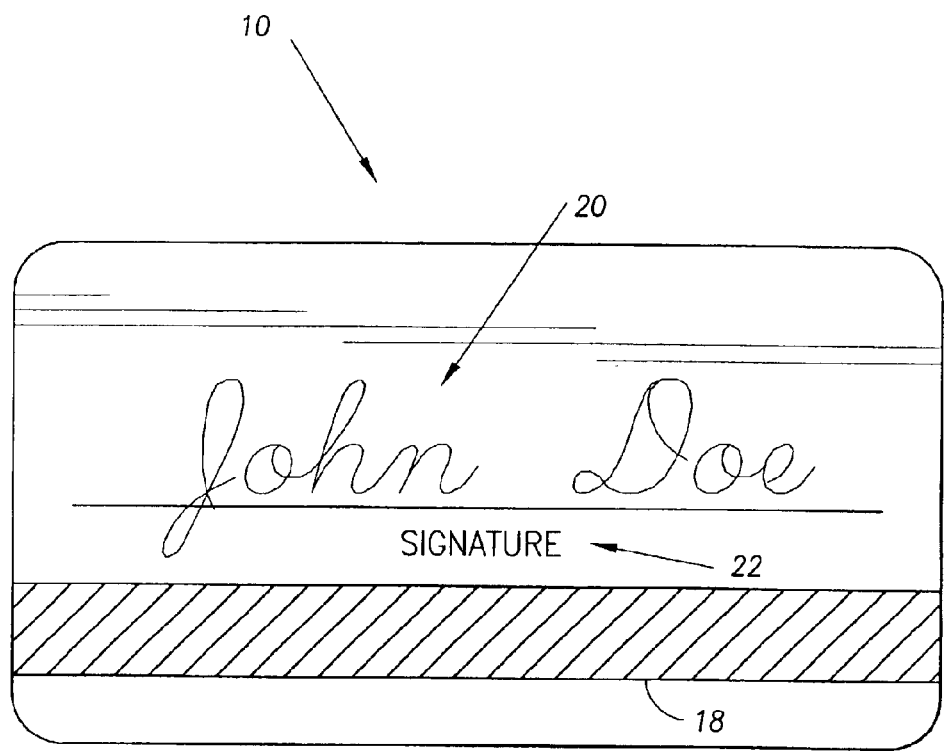
FIG. 1B is a perspective rear view of an electronic traveler's check card according to the present invention.

As shown in FIG. 1B, the rear face of the ETC 10 has indicia 12, John Doe's signature 20 over the printed signature indicia 22. There is a conventional magnetic strip 18 to identify the cardholder.

In order to obtain an ETC card a user must go to a participating vender and fill out an application form 24 illustrated in FIG. 2 which applies to both types of bank cards, and pay the amount of money credit requested. In form 24, the title 26 identifying the application as an ETC Application is located at the top. The user's name, address, phone number, and date of birth must be entered in the area marked 28. The user's passport number or numbers and expiration date(s) 30 must be entered. If the user has dual citizenship in different countries, the user must supply both passport numbers. If the user has a spouse or another person traveling with him, the second address, et cetera 32 and passport number(s) 34 must be filled out together with the birth date.

A 12 or 24 hour maximum withdrawal amount 42 is provided under the title 38, "AMOUNT DEPOSITED ON ELECTRONIC TRAVELER'S CHECK" in terms of hours and minutes for the "12 or 24 HR. CHANGE OVER TIME" and in time of the day in "AM" and "PM" "FOR THE 24 HR. CHANGE OVER TIME". Signature(s) 40 of the user(s) must be filled out. The application 24 is authenticated upon receipt of the money by the signature 44 of a bank employee and dated at 46. The rationale for limiting the withdrawal is that in the event that the ETC 10 and the PIN number are stolen, the criminal can only withdraw the maximum amount of money permitted during the 12 or 24 hour period, giving the legal card owner time to cancel the stolen ETC 10.

Figure 3:
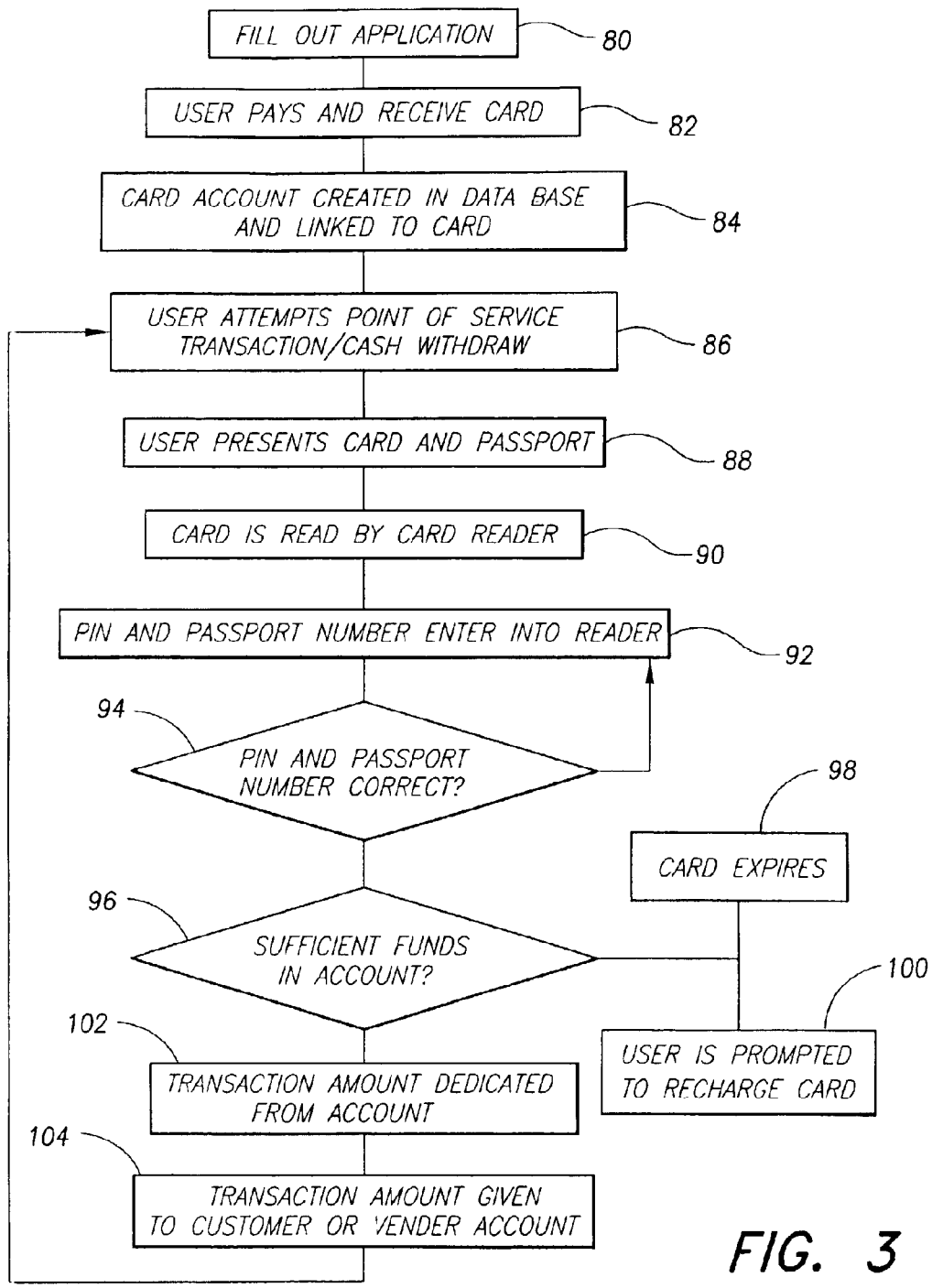
FIG. 3 is a block diagram depicting the preferred method of using the present invention.

FIG. 3 illustrates an overview of the method of obtaining and using the ETC system. Once the application 24 has been properly filled out 80 the user must transfer funds 82 to the card vender who gives the ETC card to the user. The card vender then places 84 the transferred funds into an account linked to an ETC card and activates the card. This account is stored on a database accessible by a server. The server would preferably be connected to the Internet or accessible by telephone.

Withdrawing funds 86 from the electronic travelers check account at a banking institution or a point of sale has the following security precautions, numbered as in FIG. 3:

The user must present the ETC 10 and his passport to the appropriate bank or vender clerk.

The clerk then takes the ETC and uses a magnetic reader with an attached key pad to read the magnetic strip 18 on the back of the card and input that information into a computer network.

The clerk will then enter the user's passport number into the key pad on the magnetic reader and verify that the passport picture matches the user.

The user then enters his PIN into the keypad and the amount of currency requested for withdraw from the traveler's check account.

The server then verifies the users passport number and PIN, and if both are correct electronically transfers the funds and generates a receipt.

Optionally, the receipt is sent to the reader and printed where the user may then sign a receipt. The signature can be compared to the signature on the back of the ETC by the clerk for further security. If sufficient funds are present the funds 102 are deducted from the linked account and given 104 to the user of the merchant.

The ETC card has two variations, the first is the multi-withdraw, single deposit card. The customer purchases an ETC card and deposits currency in an account linked to the card. The customer is allowed to make as many bank withdrawals, ATM withdrawals, or Points of Sales (POS) purchases as required to deplete the account. When the linked account is depleted, the card becomes invalid 98 and can be disposed of. The next time the customer needs another ETC card, the customer simply repeats the purchasing process given above.

The second variation of the ETC card is a multi-use, recharge-able card. A customer purchases an ETC card and deposits currency in an account linked to the card. The customer is allowed to make as many withdraws or Points of Sales purchases as desired. When the funds are depleted, the customer has the option 100 of adding additional funds to the linked account.

The important difference between the two abovementioned ETC cards is that the rechargeable card has an expiration date that coincides with the expiration date of the customer's passport. By having the ETC card expire on the same date as the passport the ETC card issuing company can issue a new ETC card prior to the expiration of the cardholder's passport, which will also serve as a reminder to the customer that their passport is soon to expire.

Figure 4:
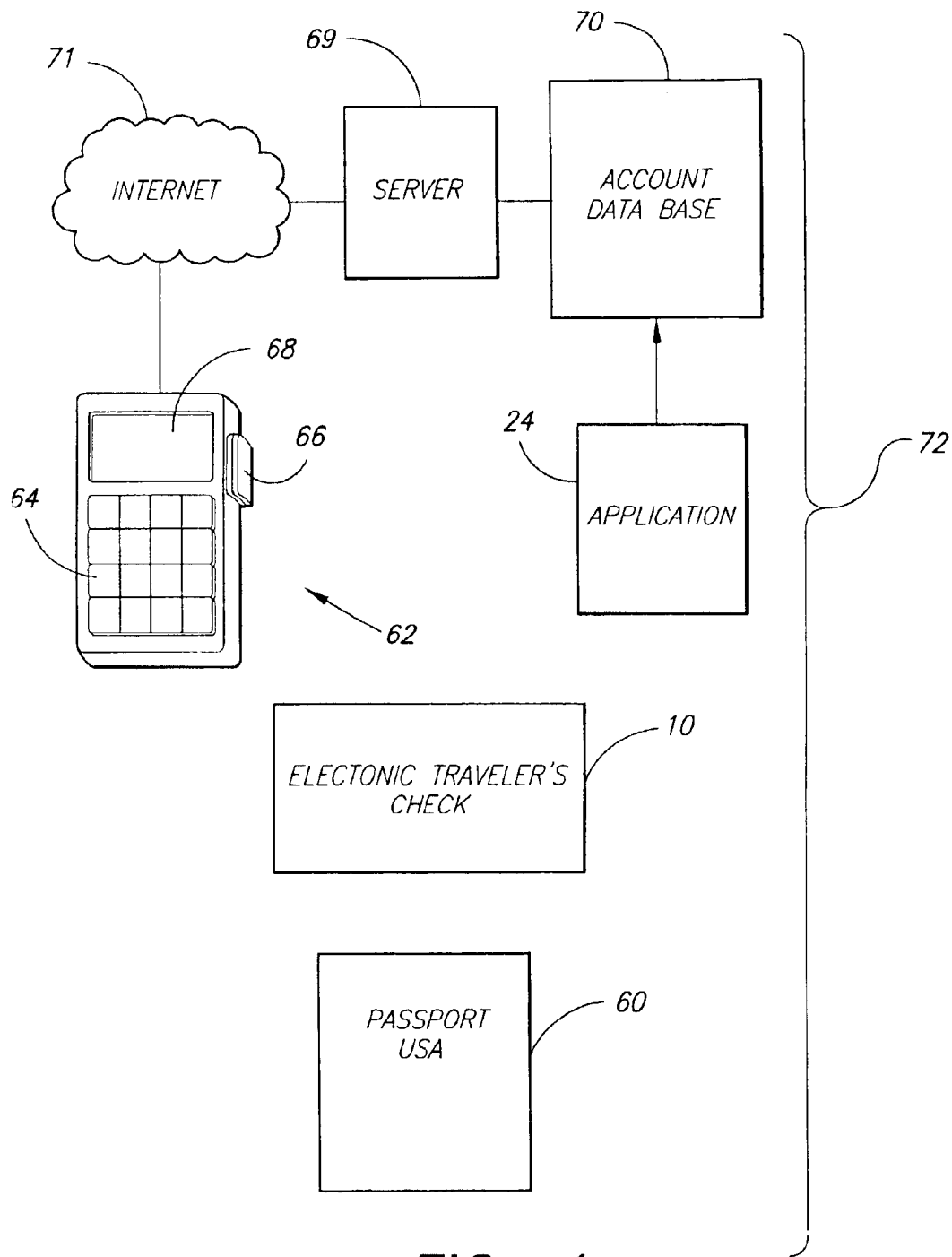
FIG. 4 is a diagram depicting the components of the present system.

FIG. 4 shows all the components present in the ETC system 72. The information from the check application 24 is entered into an account database 70 which is accessed by a server 69. A server is well known in the art and ordinarily comprises a processor, area main memory, hard disk memory and a power source. The server is connected preferably to the Internet 71. A card reader 62 having a screen 68, a keypad 64 and a magnetic strip reader 66 is used to read the ETC card 10 and input passport 60 data into the server 69. A sample card reader 66 is disclosed in U.S. Pat. No. 5,850,077 to Tognazzini.

The server 69 compares the information sent by the card reader 62 to the information present in the database 70 and determines whether the data is correct. The server 69 also determines whether there are sufficient funds present in the account to complete the proposed transaction. The process may also be completed without the use of the Internet 71 by establishing a direct dial communications link between the reader 62 and the server 69.

It is well within the ability of one skilled in the art to substitute the card reader 62 of the present invention with an ATM machine. The only difference being that there would be a present limit on the amount of funds which could be withdrawn from the linked account. This limit is not present in POS and bank transactions.

The convenience of this ETC system eliminates the problems associated with conventional ATM cards while traveling with card theft increasing in a foreign or domestic country. The difficulties associated with ATM card replacement in a foreign country and even domestically, are considerable. Issuers of paper traveler's checks are rapidly losing business and profits to ATM cards. It seems the best way to ensure future profit and growth from the traveler's check industry is to adapt and convert to ETC systems. The ETC card is compatible with ATM machines. The use of ETC cards offers issuing banks the opportunity to use the deposited capital until the ETC card is activated.

It is to be understood that the present invention is not limited to the sole embodiment described above, but encompasses any and all embodiments within the scope of the following claims.

I claim:

1. An electronic traveler's check system, comprising:
   an electronic traveler's check card having verification characteristics and a magnetic strip;
   a card reader having a keypad, magnetic strip reader and display;
   a server;
   a valid passport belonging to a holder of said electronic traveler's check card;
   a database connected to said server, said database containing information relating to the holder of said electronic traveler's check card, the information including the holder's passport number, account number and amount of currency associated with said electronic traveler's check card;
   a means for allowing communication between said card reader and said server;
   a means for verifying data from the card reader; and
   a means for verifying currency account data and electronically transferring money;
   wherein said card reader is connectable to said server.

2. The electronic traveler's check system according to claim 1, wherein said electronic traveler's check card expires when said amount of currency associated with said electronic traveler's check card is depleted.

3. The electronic traveler's check system according to claim 1, wherein said electronic traveler's check card expires upon expiration of said valid passport.

4. The electronic traveler's check system according to claim 1, wherein said means for verifying currency data further comprises:

a means for prompting the holder of said electronic traveler's check card to add additional funds to said electronic traveler's check card.

5. The electronic traveler's check system according to claim 1, further comprising:

a means for generating a receipt; and a printer located on said card reader.

6. The electronic check cashing system as in claim 1, further comprising: a means for restricting an amount of currency that can be deducted from the amount of currency associated with said electronic traveler's check card in a particular time period.

7. A method of using an electronic traveler's check system, comprising the following steps:

a) presenting an electronic traveler's check card and a passport of a user to an appropriate bank or vender clerk;

b) reading the electronic traveler's check card with a magnetic card reader;

c) entering a passport number and a personal identification number of the user into said magnetic card reader;

d) verifying said passport number and said personal identification number;

e) verifying that sufficient funds are present in an account of the user linked to said electronic traveler's check card.

8. The method of claim 7, further comprising the following steps:

f) verifying that a picture on said passport matches the user of said electronic traveler's check card.

9. The method of claim 8, further comprising the following steps:

g) generating a receipt;

h) having the user provide a signature on the receipt;

i) comparing said signature on the receipt to that on the back of said electronic traveler's check card.

10. The electronic check cashing system as in claim 6, wherein the time period begins at a time selected by the holder of said electronic traveler's check card.

11. The electronic check cashing system as in claim 10, wherein the amount of currency that can be deducted in the particular time period is selected by the holder of said electronic traveler's check card.

12. The electronic check cashing system as in claim 11, wherein duration of the time period is selected from the group consisting of 12 hours and 24 hours.

* * * * *